United States Patent

[11] 3,580,656

| | | |
|---|---|---|
| [72] | Inventor | Arthur N. Carson<br>Bristol, Conn. |
| [21] | Appl. No. | 523,995 |
| [22] | Filed | Feb. 1, 1966 |
| [45] | Patented | May 25, 1971 |
| [73] | Assignee | Carson Laboratories Inc.<br>Bristol, Conn. |

[54] HOLOGRAM APPARATUS AND METHOD
15 Claims, 7 Drawing Figs.

[52] U.S. Cl................................................. 350/3.5,
340/172.5, 350/162
[51] Int. Cl.................................................. G02b 27/22
[50] Field of Search........................................... 88/1
(OSR); 350/160 (1HF), 96

[56] References Cited
UNITED STATES PATENTS

| 3,041,459 | 6/1962 | Greene........................ | 88/1(U) |
| 3,208,342 | 9/1965 | Nethercot ................... | 350/96 |
| 3,296,594 | 1/1967 | Van Heerden ............... | 88/1(OS) |
| 3,085,469 | 4/1963 | Carlson ....................... | 350/160 |

OTHER REFERENCES

Emmett Leith & Juris Upatnieks, "Photography by Laser" June 1965, Scientific American, Vol. 212, No. 6 pp. 24—35.

Van Heerden, "Theory of Optical Information Storage in Solids," April 1963, Applied Optics, Vol. 2, No. 4, pp. 393—399.

*Primary Examiner*—David Schonberg
*Assistant Examiner*—Michael J. Tokar
*Attorney*—Fishman and Van Kirk

ABSTRACT: An information processing system is presented for information storage and retrieval with a color center crystal wherein the information to be stored is generated by electrically modulating a light beam, and the information is then stored by forming a hologram of the desired information in the absence of exposure of the crystal to light from the subject.

INVENTOR
ARTHUR N. CARSON
BY Fishman and Van Kirk
ATTORNEYS

HOLOGRAM APPARATUS AND METHOD

This invention relates to the recording and retrieval of information. More particularly, this invention is directed to recording of information wherein a high capacity, multiimage hologram device is employed as a recording medium.

The use of intersecting beams of light, one being a reference beam and the other being information bearing as by reflection from an object, to create hologram records is of particular interest with the availability of highly coherent light beams from laser sources. However, holography has heretofore been restricted to the use of relatively thin (10—15 microns) photographic emulsions for recording. The use of these relatively thin emulsions has limited truly effective exploitation of the hologram capability for storing independent multiple images.

Retrieval of independent multiple images in a hologram utilizes selective Bragg reflection from independent sets of interference surfaces, which occurs only at one particular angle of incidence of the illumination for each set of surfaces. With photographic emulsions of only 10—15 microns thickness, utilization of selective Bragg reflection is severely limited by the very abbreviated extent of the interference surfaces which may be recorded in the thin material, thus resulting in a correspondingly reduced capability to discriminate or resolve between independent records stored in a single medium.

In the present invention a relatively thick color center crystal is used as the hologram recording medium. As a result of the thickness of the color center crystal which permits the creation of well-developed interference surfaces within the crystal itself capable of providing selective Bragg reflection, the number of overlapping images that can be stored and resolved for reconstruction is increased over the capability of a thin emulsion by at least one and probably two or more orders of magnitude.

The use of thick color center crystals as hologram recording media also facilitates digital or analog representation of two-dimensional and three-dimensional subjects as holograms from purely numerical data concerning the subjects. Proper retrieval illumination of the crystal will then result in reconstruction of the original subject, even though actual wavefronts of light from the subject never impinged on the crystal.

Accordingly, one object of the present invention is to produce a novel hologram system having high multiple-image storage capacity.

Another object of the present invention is to produce a novel hologram system having a color center crystal as the recording medium.

Another object of this invention is to produce a novel hologram system in which holograms are created from two-dimensional digital or analog information.

Another object of the present system is to produce a novel hologram system in which three-dimensional subjects can be reconstructed from a color center recording medium, in which no physical embodiment of the subject need exist, and in which only representative analog or digital information concerning the subject was stored.

Other objects and advantages will be apparent from the following detailed description and drawings.

In the drawings.

In the several figures of the drawings like elements are numbered alike.

Figure 1:
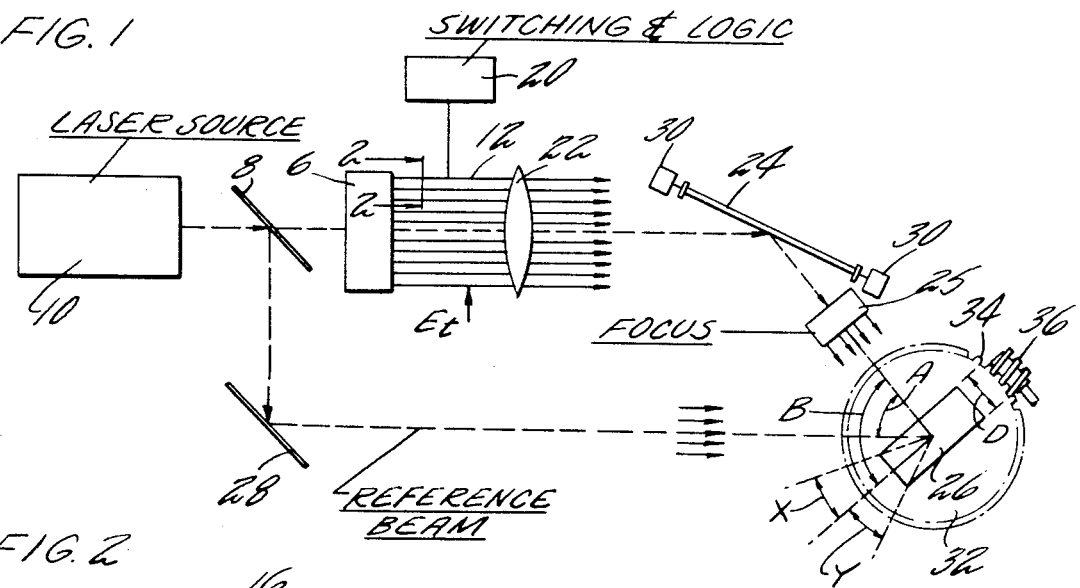
FIG. 1 is a plan view of a schematic of a hologram system incorporating the present invention.
Figure 2:
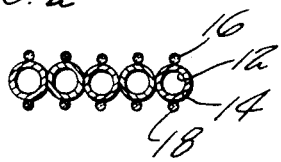
FIG. 2 is a view of an element of FIG. 1 taken along line 2—2 of FIG. 1.

Referring now to FIG. 1, a cylindrical lens 6 receives light from a partially reflecting mirror 8 which is illuminated from a laser light source 10. Lens 6 is connected, preferably by cementing, to a group of a large number of optical waveguide fibers 12. There are several thousand of the fibers 12, all of which are arranged in substantially parallel relationship in a single row. As is shown in FIG. 2, each of the optical waveguide fibers 12 is encased in an electro-optic cladding 14. Pairs of opposed electrical conductors 16 and 18 run along the upper and lower surface of each of the waveguide fibers 12 to control light transmission through the fibers. The electrical conductors 16 and 18 may be, for example, small diameter wires or deposited strips of conducting material. The overall diameter of each waveguide fiber 12 with cladding 14 is about 10 microns; thus, a row of several thousand waveguide fibers presents a bundle of 1 or 2 inches in width.

Light from laser light source 10 is delivered through partially reflective mirror 8 and cylindrical lens 6 simultaneously to all of the optical waveguide fibers 12. An electronic switching and logic circuit 20 is connected to the conductors 16 and 18 to activate individual waveguide fibers 12 in a desired programmed sequence by imposing electrical pulses on the conductors associated with the particular waveguide fibers. The electrical pulses modify the index of refraction of the electro-optic cladding 14 thereby controlling the efficiency of internal light reflection in the waveguide fibers. When the ratio of refractive indices between a waveguide fiber 12 and its cladding 14 is low, losses are high and light will not travel along the waveguide fiber; conversely, when the ratio of refractive indices is high, losses are low and light will travel through the particular fiber.

As an alternative arrangement, a traveling microwave electric field could be established transverse to the axes of the individual waveguide fibers. The traveling microwave electric field would, either alone or in cooperation with a uniform electric field coaxial with the individual fibers, act to modify the refractive index of the cladding 14 around the individual fibers 12 to selectively control light transmission through fibers 12. In this alternative arrangement the laser source 10 would be pulsed at intervals just sufficient for an electric signal to propagate transversely across the row of fibers. At each pulse of the light source the electric field across each fiber 12 will represent the magnitude of the signal at a certain time after the last pulse, the time being proportional to the position of the fiber in the row. Thus, at the time of the pulse a complete reproduction of the electric signal will be converted to intensity-modulated light beams directed toward a collimating lens 22, lens 22 preferably being cemented to the ends of fibers 12. From lens 22 the light goes to a beam deflecting mirror 24, to a variable focus device 25 such as a zoom lens or an electro-optic focusing element, either of which could be connected to switching and logic circuit 20 for programmed operation, and thence to an information storage crystal 26.

Information storage crystal 26 is a color center crystal in which information can be stored by changing the light transmission characteristics of selected portions of the crystal. For example, information storage crystal 24 could be an R center alkali halide crystal or a potassium bromide crystal having U centers as is disclosed in my copending application Ser. No. 453,294 filed May 5, 1965, to which reference is hereby made. Concomitantly with the delivery of light to information storage crystal 26, coherent laser light from laser source 10 is partly reflected by mirror 8 to a mirror 28 and from mirror 28 to information storage crystal 26 where it impinges on crystal 26 in a direction having an angle A with respect to the direction of information bearing light from mirror 24. The unmodulated coherent light from mirror 28 acts as a reference beam and forms interference patterns with the modulated coherent light from mirror 24 to bleach a selected family of parallel surfaces in crystal 26 through the color center bleaching process as described in my above-identified copending application to form a hologram in information storage crystal 26.

The information carried in the light path from waveguide fibers 12 to mirror 24 to information storage crystal 26 will be either analog or digital depending on whether waveguides 12 are transmitting light of continuously-variable intensity or are pulsed off and on. In either event, with only a single row of optical waveguide fibers 12, only a single row of information can be stored in crystal 26 for each complete operating cycle of waveguides 12. The information would represent, for example, part of an apparent object. In order to provide for storage of succeeding rows of information in crystal 26, mirror 24 is mounted in mounts 30 so that it is rotatable about an axis parallel to the plane of the paper to simulate scanning of the apparent object represented by the information generated by the switching of fibers 12. By rotating mirror 24 about the axis parallel to the plane of the paper, the mirror acts as a variable beam deflector so that successive rows of information derived from successive cyclings of waveguide fibers 12 and simulating light emanating from different positions on the apparent object can be directed to crystal 26 for storage. Of course, it will be obvious to those skilled in the art that other methods could be employed for directing the successive rows of information to crystal 26; for example, other types of beam deflectors such as electro-optic beam deflectors could be used, crystal 26 could be physically moved perpendicular to the plane of the paper such as by being mounted on a moveable table, or the structure consisting of laser light source 10, mirror 8, lens 6, fiber waveguides 12, and lens 22 could be similarly mounted for movement. Also, the fiber bundle could be made in several rows rather than just the one row disclosed. Regardless of the method by which the light from mirror 24 is directed to information storage crystal 26, the light from mirror 28 impinges on the entire surface of the crystal to insure intersection of light beams to create holograms.

The information from a number of cyclings of fibers 12 is two dimensional, and could represent, for example, a waveform. As long as variable focusing device 25 is not activated to change focus, it can be considered to be eliminated from the system, and the two-dimensional information will be stored in crystal 26 as a hologram which can be subsequently recreated for study or any other purpose.

The directing of the output from successive cycles of waveguide fibers 12 to information storage crystal 26 can be used for hologram storage of items such as engineering drawing layouts. Multiple patterns can be stored in information crystal 26 to provide representation of a three-dimensional object from a number of two-dimensional representations by changing the focus of focusing device 25. For example, after one complete engineering layout of a section of a subject is stored in information crystal 25, switching and logic circuitry 20 can be programmed to modulate the output of waveguide fibers 12 to generate information commensurate with another design layout of the same subject at a different location on the subject, and this modulated output would also be directed through focusing device 25 to crystal 26 at the same angle A to the reference beam but at a different focusing depth with respect to the crystal. Similarly, third and succeeding layouts of the same subject could be stored in crystal 26 at different focusing depths to build up a single stored three-dimensional hologram image of the subject. The variable focus element 25 accounts for the depth coordinate of the succeeding layouts.

Numerous separate two-dimensional or three-dimensional images can be stored in crystal 26 at an angle B to the surface of the crystal. By selectively activating motor 38, crystal 26 can be selectively positioned so that the light from mirror 24 impinges on the crystal at angles varying from B+Y to B−Y, the angle between the crystal and the reference beam also changing. This changing of the angle at which the light from mirrors 24 and 28 impinges on crystal 26 results in successive groups of information from waveguide fibers 12 representing different three-dimensional subjects being stored in crystal 26 in sets of parallel interference surfaces of different angles. That is, information representing, for example, a second three-dimensional subject would be delivered to crystal 26 at an angle B+Δ Y to the surface thereof so that the information commensurate with this second subject would be stored in crystal 26 in a series of parallel interference surfaces disposed throughout crystal 26 in a different angular array than the first series of parallel interference surfaces. Similarly, third and succeeding groups of information representing, for example, third and succeeding subjects would each be stored at different angular sets of parallel interference surfaces by rotating crystal 26 to change the angle at which the light from mirror 24 impinges on the surface of crystal 26 between B+Y and B−X. The storage of information in each set of interference surfaces simulates the effect that would have been produced on crystal 26 if a hologram had been created directly from the original subject.

Figure 6:
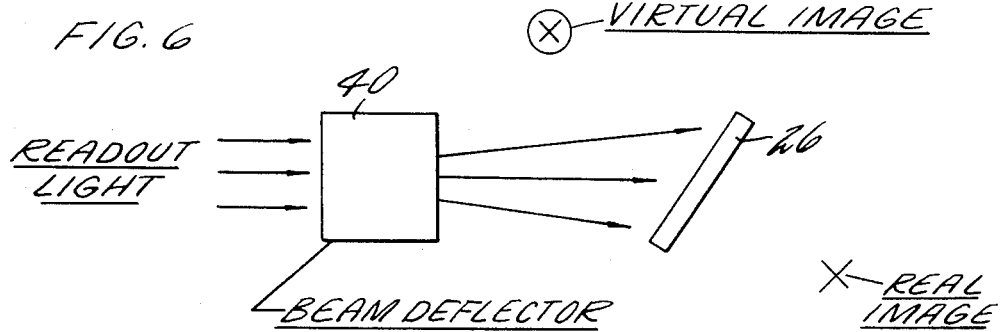
FIG. 6 is a view of a readout system for use in the present invention.

Readout is accomplished by illuminating crystal 26 with an unmodulated laser beam incident on the surface of the crystal at the Bragg angle for the particular set of interference surfaces at which the desired information was stored. Since each separate three-dimensional layout figure was stored in information crystal 26 at a different angle, and hence at a different set of interference surfaces, readout of superimposed multiple images can be accomplished by time shared illumination of several different patterns stored in the crystal at different angles of incidence of the illuminating light. As shown in FIG. 6, readout illumination for a laser light source is delivered to a barium titanate beam deflector 40, and the output from beam deflector 40 is delivered to information storage crystal 26 at a variety of angles in sequential or random fashion as determined by electric potentials applied to the beam deflector. Information stored in any particular set of interference surfaces in crystal 26 will be recreated as a three-dimensional spatial image (two-dimensional if the stored information was two-dimensional) when the readout light is incident on the face of crystal 26 at the proper Bragg reflection angle for that particular set of interference surfaces. When readout light is shifted by beam deflector 40 so that it becomes incident on the face of crystal 26 at another angle, the information stored in crystal 26 in a different set of interference surfaces will be reconstructed in the form of virtual and real images. Thus, as the readout light is deflected by beam deflector 40 to scan across the face of crystal 26, the information stored in different sets of interference surfaces will be reconstructed as the readout light becomes incident on the crystal at the Bragg reflection angle for each particular set of interference surfaces.

Assuming, for example, that it is desired to simultaneously view an overlay of five particular patterns, beam deflector 40 would be programmed to cause the readout light to be sequentially incident on crystal 26 at the five appropriate Bragg angles. Visual retention and switching of the readout light at proper speeds will allow for simultaneous readout of the five patterns in overlay fashion. The several items of information to be reproduced in this overlay manner, could, for example, include several piping layouts such as steam piping, electrical conduits, and water conduits for a ship, and the spatial overlays could be created to insure that there was no interference between the various conduit systems. Of course, it will be understood that the foregoing discussion of five simultaneously reproduced patterns was by way of illustration only; other numbers of patterns could be simultaneously recreated as desired.

While the foregoing description has disclosed a system in which information storage crystal 26 is rotated to allow for the storage of information commensurate with different two-dimensional or three-dimensional subjects through the creation of differently oriented sets of interference patterns the differently oriented sets of interference patterns could also be created by varying the angle A between the reference beam and the information carrying beam in the process of storing the information in crystal 26.

As has been previously pointed out, crystal 26 is relatively thick so that a large number of distinct two-dimensional or three-dimensional patterns can be stored in and recreated from the crystal by the discriminating illumination of distinct sets of different interference surfaces. The thickness or depth D of the crystal is on the order of one-tenth of an inch with the result that several hundred to several thousand different distinct images can be stored in and recreated from one crystal of approximately 2 inches in length and 2 inches in height.

Figure 3:
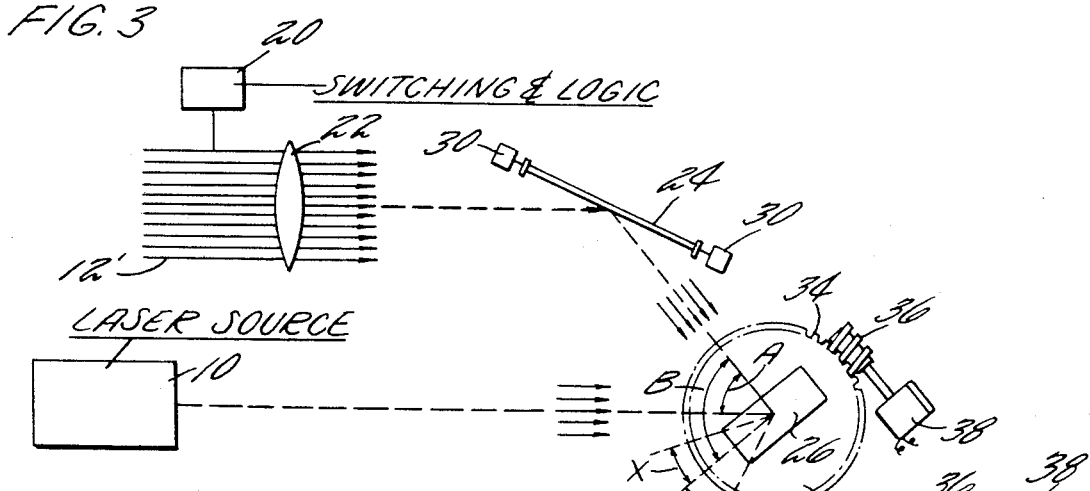
FIG. 3 is a view similar to FIG. 1 showing an alternative system.

Referring now to FIG. 3, a system is shown similar to the system of FIG. 1. Laser light source 10 is omitted from the system in FIG. 3, and the fibers 12' are individual optical fiber lasers rather than the optical waveguide fibers of the FIG. 1 system. The individual fiber laser 12' are as shown in FIG. 2 with an electro-optical cladding 14 around each fiber laser and with electrical conductors 16 and 18 along opposed surfaces. As in the FIG. 1 system, signals from switching and logic circuitry 20 to conductors 16 and 18 selectively activate the fiber lasers by varying the index of refraction of the cladding 14. The modulated output from the individual fiber lasers 12' is delivered through collimating lens 22 to mirror 24 and thence to crystal 26. Laser output from source 10 of the same wavelength as the output from fibers 12' is delivered to crystal 26 to be used as the unmodulated reference beam intercepting the modulated information beam at an angle A. In all other respects the system of FIG. 3 operates similarly to the system of FIG. 1 both for information storage and for the readout described with reference to FIG. 6.

Figure 4:
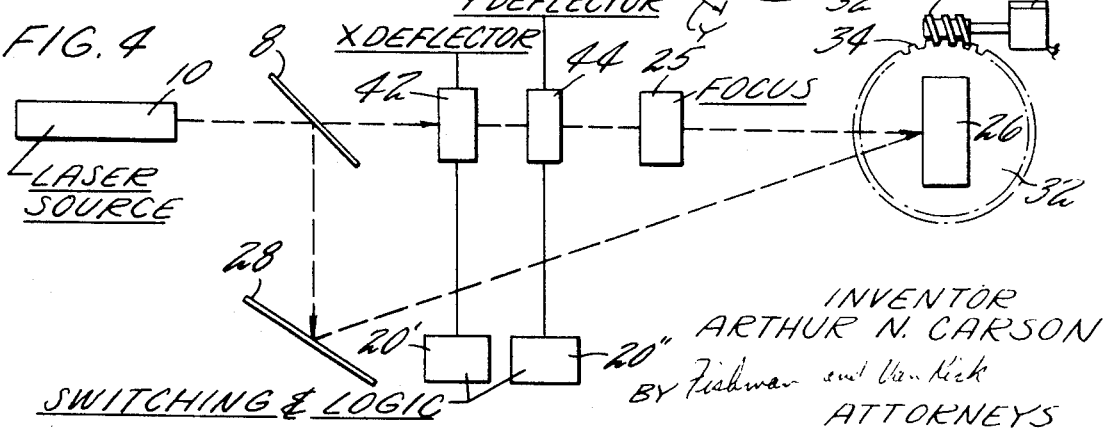
FIG. 4 is a plan view of an alternative system incorporating the present invention.

Referring now to FIG. 4, an alternative hologram system is shown using the present invention. Light from laser source 10 passes through partly reflecting mirror 8 to a beam deflector 42 and thence to another beam deflector 44. Beam deflectors 42 and 44 are both electro-optic elements such as barium titanate crystals and they are arranged so that they are crossed with respect to each other. That is, X deflector 42 and Y deflector 44 deflect the beam from laser 10 in mutually perpendicular directions, one parallel to the plane of the paper and one perpendicular to the plane of the paper. The deflectors 42 and 44 are programmed from switching and logic elements 20' and 20", respectively, to impart predetermined modulating deflections in two dimensions to the beam from laser 10.

After the beam passes through deflectors 42 and 44 it passes through variable focus 25 and thence to information storage crystal 26 where it intersects with laser light reflected from mirrors 8 and 28 to form holograms in crystal 26. Deflectors 42 and 44 each impart a dimension of information to the laser beam, and variable focus 25 imparts the third dimension of depth. Thus, information delivered to crystal 26 is three-dimensional, and a complete three-dimensional subject can be stored in crystal 26 from numerical information, i.e. coordinates, even though crystal 26 never receives light from the actual subject. If desired, output from the laser light source can be intensity modulated in this or any of the other embodiments for effects such as shading.

As in the embodiments of FIGS. 1 and 3, crystal 26 in FIG. 4 is mounted on a rotatable table 32 which is rotated to various positions for the storage of many superimposed three-dimensional images. Readout at Bragg reflection angles is as described previously with respect to FIG. 6.

Figure 5:
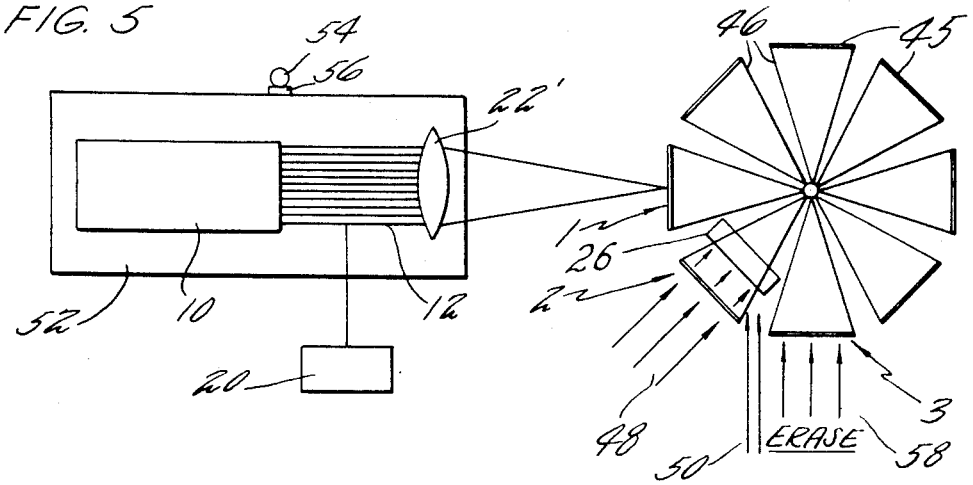
FIG. 5 is a view similar to FIG. 1 showing another alternative system.

Referring now to FIG. 5, an alternative system is shown for hologram information storage. Light from a first laser light source 10 is delivered to waveguide fibers 12 (or laser fibers 12') which are modulated as before by switching and logic circuitry 20 to generate individual outputs from the individual fibers. A focusing lens 22, focuses the output from the fibers on a plane at which is located a relatively thin layer of a color center alkli halide crystal 45. A number of the crystals 45 are arranged in a circular array and are suspended from centrally rotatably mounted spokes 46.

As the array of crystals 45 is rotated in a counterclockwise direction, information from the modulated output of the individual fibers is stored in the particular crystal at position 1 in the focal plane of lens 22' through the process of selective bleaching of color centers one row at a time. After a complete pattern of rows of information has been stored in one of the crystals 45, the counterclockwise rotation of the array of crystals moves the next succeeding crystal into the focal plane of lens 22' while the information bearing crystal is moved to position 2. The information bearing crystal at position 2 is illuminated with a second coherent laser light 48 of proper wavelength to interrogate the crystal so that the crystal transmits light in accordance with the information stored thereon. The wavelength of light 48 is selected so that it will neither erase information stored in crystal 45 nor cause any further bleaching. The light transmitted through the crystal in position 2 impinges on information storage crystal 26 which also illuminated with reference beam 50 derived from the same source as laser light 48 to create a hologram in crystal 26 commensurate with the information stored on the crystal in position 2.

In the FIG. 5 embodiment laser source 10, fibers 12 and lens 22' are mounted on a table 52 which can be moved in and out the plane of the paper by worm 54 and gear 56 attached to table 52. By moving table 52 up and down perpendicular to the plane of the paper, the rows of information generated by successive cyclings of the fibers can be positioned at different locations on the crystals 45.

Of course, as previously described with respect to the systems of FIGS. 1 and 3, crystal 26 in the FIG. 5 embodiment may also be angularly varied for multiple image storage.

As the crystals 45 continue to rotate in a counterclockwise direction after the information has been transferred in crystal 26, the crystals move into position 3 where they are exposed to light of a proper wavelength to erase the information stored therein by regenerating the original color centers. Thus, the crystal is put in a condition for another pass through the focal plane of lens 22' for reuse.

Figure 7:
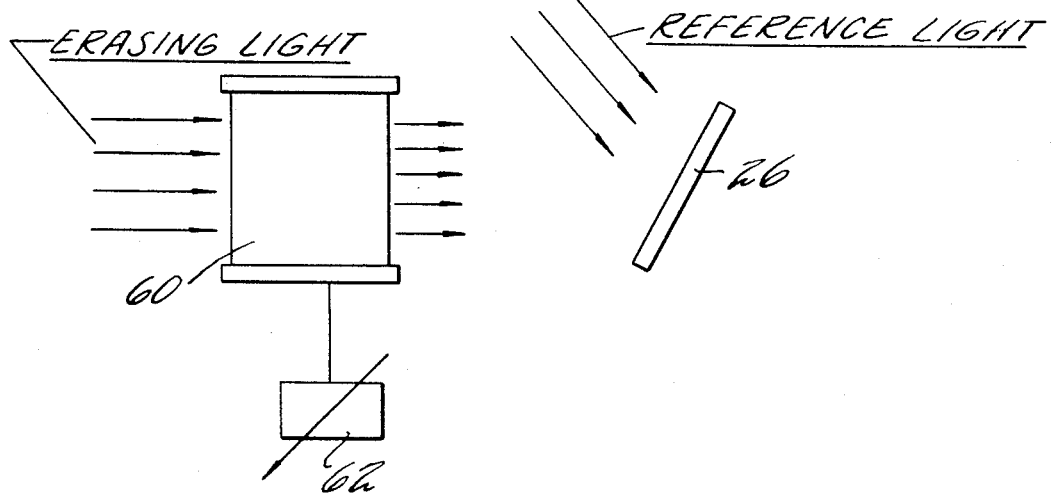
FIG. 7 is a view of an erasing system for use in the present invention.

Referring now to FIG. 7, an arrangement is shown for selective erasing of information stored in a particular hologram crystal 26. Light of a proper wavelength for erasing color centers in the particular crystal employed is delivered to a phase-shifter 60 and thence to crystal 26. A reference light is also caused to impinge on the surface of crystal 26 so that the erasing light intersects the reference light at the appropriate angle for the image of interest as the phase of erasing light is modulated with phase-shifting element 60. The transmission of erasing light through crystal 26 is observed as the phase of the erasing light is modulated by changing the output from a variable power supply 62. When the transmission of erasing light reaches a minimum, the proper phase relationship between the erasing beam and the reference beam has been established for erasing in a particular set of interference surfaces, and erasing light is then continued at that particular phase setting until there is a constant output from crystal 26 indicating a full erasure. Of course, the entire crystal can be erased by a prolonged exposure of the entire crystal to erasing light alone.

While preferred embodiments of the present invention have been shown and described, various modifications and substitutions may be made without departing from the spirit and scope of this invention. Accordingly, it is to be understood that this invention has been described by way of illustration rather than limitation.

What I claim is:

1. An information handling system comprising a source of coherent light; electro-optic means in the path of at least part of said coherent light for modulating at least part of the light from said coherent light source in accordance with parameters of a subject and in the absence of said subject, said electro-optic means being responsive to electrical inputs to vary light transmission therethrough; a crystal having centers therein of alterable state in response to light of predetermined wave length, said crystal being positioned to receive said modulated light at a predetermined angle of incidence to said crystal; and means for establishing a coherent reference light, said reference light being coherent with the light from said source and being directed to said crystal at a predetermined angle of incidence thereto to intersect said modulated light at said crystal at a predetermined angle; said modulated light and reference light interacting to alter centers in said crystal and to create a hologram in said crystal in accordance with said parameters of a subject and in the absence of exposure of said color center crystal to light from the subject.

2. An information handling system as in claim 1 including means positioned between said electro-optical means and said crystal for varying the focus of said modulated light to impart a depth factor to said modulated light commensurate with a depth parameter of the subject.

3. An information handling system as in claim 1 including means for changing the position of the crystal to vary the angles of incidence between said modulated light and said crystal and between said reference light and said crystal to store a plurality of holograms in said crystal.

4. An information handling system as in claim 3 including means for illuminating said crystal in at least one selected Bragg angle to recreate information stored in at least one selected hologram.

5. An information handling system as in claim 1 wherein said electro-optic modulating means includes a plurality of optical fiber wave guides and electrically responsive means for varying light transmission through said wave guides.

6. An information handling system as in claim 1 wherein said source of coherent light includes a plurality of fiber lasers, and wherein said electro-optical modulating means includes means for controlling lasing of said fibers.

7. An information handling system as in claim 1 including: means for selectively erasing a hologram in said crystal, said erasing means including a source of coherent erasing light of selected wavelength for erasing altered centers in said crystal; a phase shifter in the path of said erasing light between said source of erasing light and said crystal; a source of coherent erasing reference light, said erasing light and said erasing reference light being incident on said crystal at predetermined angles; and means connected to said phase shifter for shifting the phase of said coherent erasing light.

8. An information handling system comprising: a crystal having centers therein of alterable state in response to light of predetermined wavelength; a source of coherent information light of selected wavelength to alter centers in said crystal; said crystal being in a light path from said light source; at least a first electro-optic beam deflecting means in said light path between said light source and said crystal for deflecting said information light, said electro-optic means being responsive to electrical inputs to deflect light passing therethrough; means for delivering electrical signals to said deflecting means to deflect said information light in accordance with parameters of a subject and in the absence of the subject; a source of coherent reference light directed to said crystal, said reference light and said information light being mutually coherent and intersecting at said crystal at a predetermined angle with respect to each other and at a predetermined angles with respect to said crystal, and said information light and said reference light interacting to alter centers in said crystal to create a hologram in said crystal commensurate with the subject in the absence of exposure of said crystal to light from the subject; and variable focus means in said light path between said light source and said crystal for imparting depth characteristics of the subject to the hologram.

9. An information handling system as in claim 8 including second electro-optic beam deflecting means in said light path for deflecting said information light at an angle with respect to the deflection from said first beam deflecting means, and wherein said variable focusing means is between said crystal and said both of said beam deflecting means.

10. An information handling system as in claim 8 including means for changing the position of the crystal to vary the angles of incidence between said information light and said crystal and said reference light and said crystal to store a plurality of holograms in said crystal.

11. An information handling system as in claim 8 including means for illuminating said crystal in at least one selected Bragg angle to recreate information stored in at least one selected hologram.

12. An information handling system as in claim 8 including: means for selectively erasing a hologram in said crystal, said erasing means including a source of coherent erasing light of selected wavelength for erasing altered centers in said crystal; a phase shifter in the path of said erasing light between said source of erasing light and said crystal; a source of coherent erasing reference light, said erasing light and said erasing reference light being incident on said crystal at predetermined angles; and means connected to said phase-shifter for shifting the phase of said coherent erasing light.

13. An information handling system comprising: A first source of coherent light of a first predetermined wavelength; means for modulating light from said source of coherent light; information storage means including a first crystal having centers therein of alterable state in response to light of said first predetermined wavelength, said first crystal being positioned to receive said modulated light to alter centers in said first crystal to render said altered centers transparent to light of a second predetermined wavelength; a second source of coherent light of a second predetermined wavelength; positioning means including means for placing said first crystal with altered centers in the path of light from said second source of coherent light; a second crystal having centers therein of alterable state in response to light of said second predetermined wavelength, said second crystal being positioned to receive light passed by said first crystal, and a source of coherent reference light directed to intersect said light passed by said first crystal at said second crystal to create a hologram in said second crystal.

14. An information handling system as in claim 13 wherein said information storage means includes a plurality of first crystals having centers therein of alterable state in response to light of said first predetermined wavelength, said positioning means including means for placing each crystal of said plurality of crystals to receive said modulated light and in the path of said second source of coherent light in predetermined order.

15. An information handling system as in claim 14 including means for erasing information stored in said first crystals subsequent to each of said first crystals being in the path of said second source of coherent light.